Patented Aug. 30, 1932

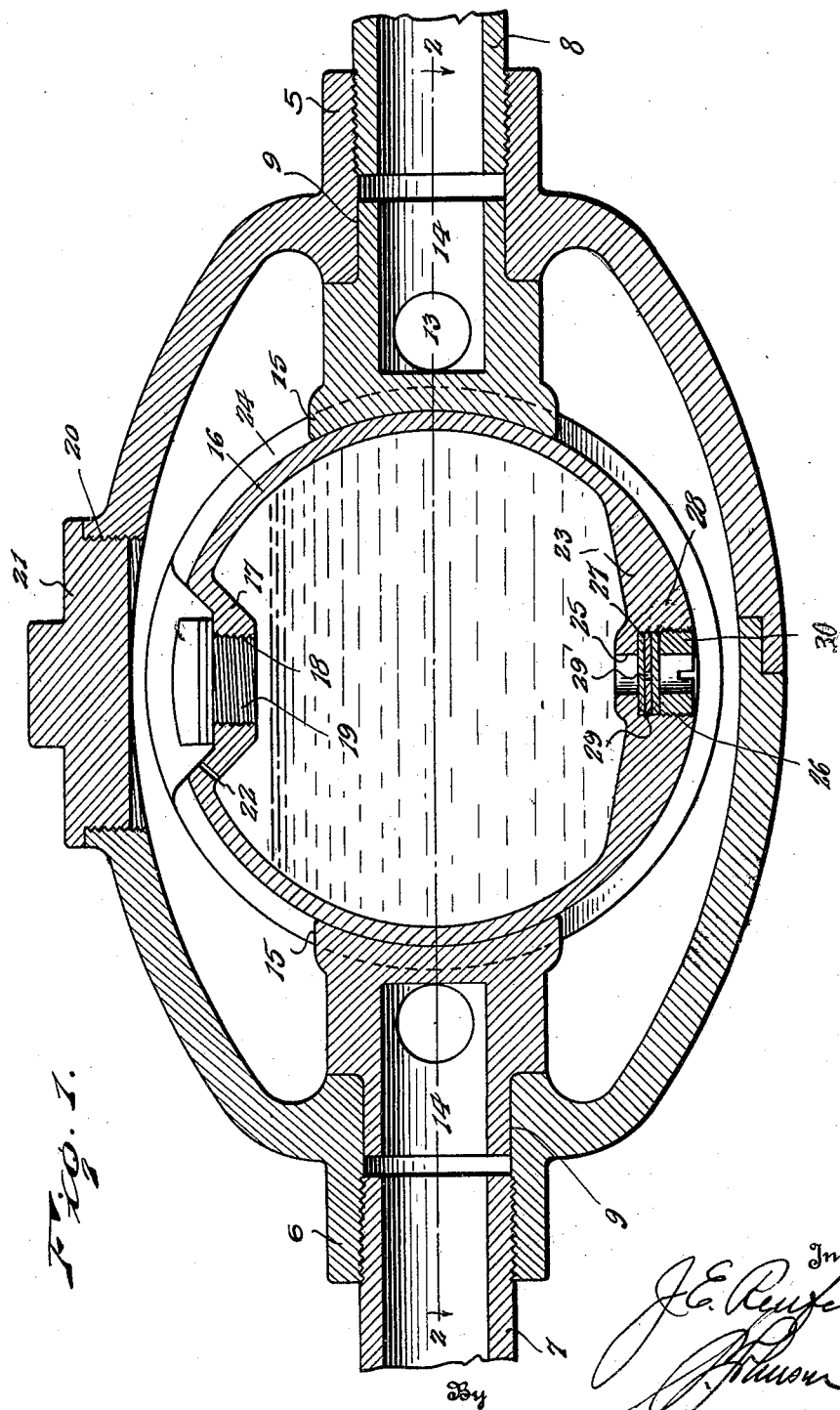

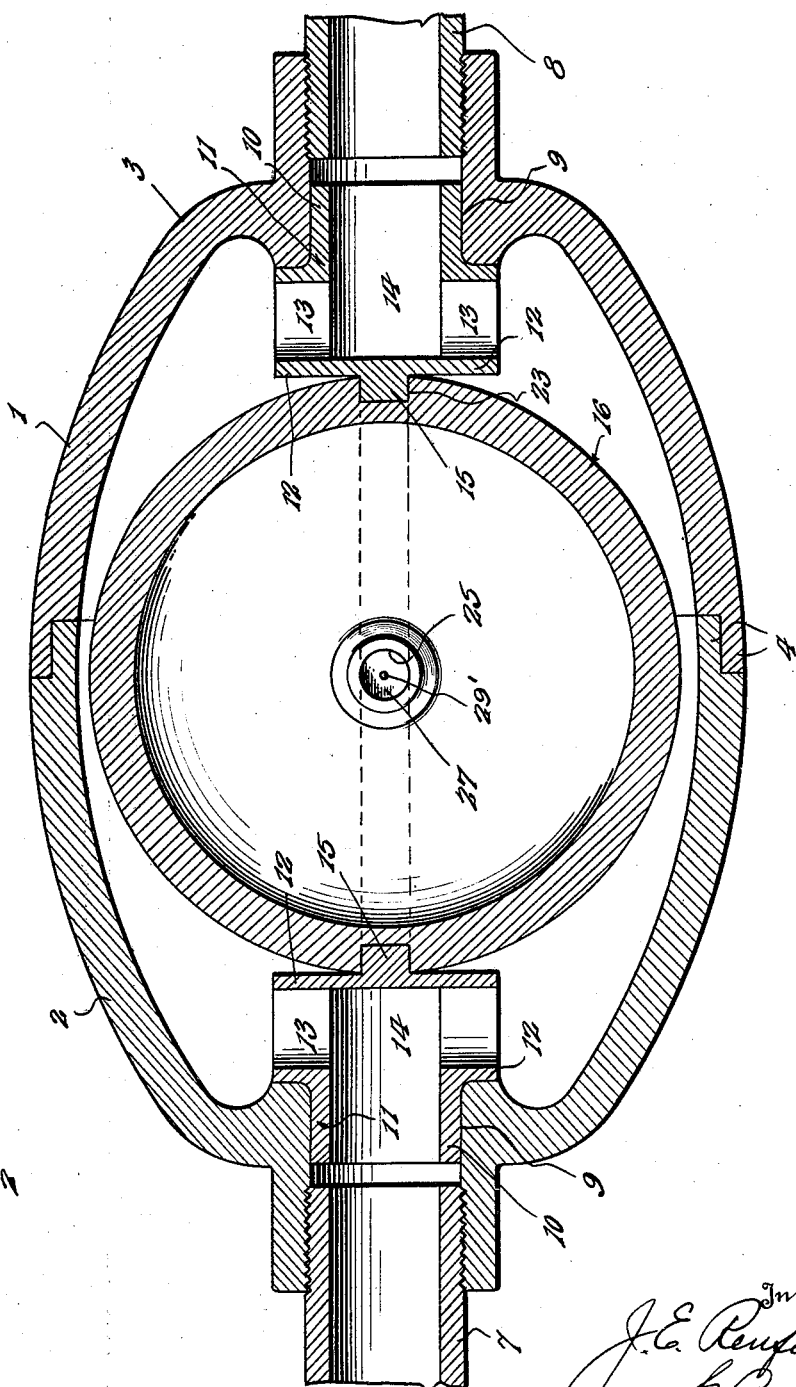

1,874,062

UNITED STATES PATENT OFFICE

JOHN E. RENFER, OF CLEVELAND, OHIO, ASSIGNOR TO THE CLEVELAND ROCK DRILL COMPANY, OF CLEVELAND, OHIO

AIR LINE OILER

Application filed October 9, 1928. Serial No. 311,325.

The present invention is directed to improvements in air line oilers more particularly designed for use in connection with rock drills.

The primary object of the invention is to provide a device of this character so constructed that the lubricant will be carried with the pressure fluid to the drill in a uniform manner.

Another object of the invention is to provide a device of this type constructed in such manner that a constant supply of lubricant will be conducted with the pressure fluid into the drill without interrupting the drilling operation, the lubricant so conducted serving to effectively lubricate the working parts of the drill.

With these and other objects in view, as will appear as the description proceeds, the invention accordingly consists in the novel features of construction and arrangement of parts to be hereinafter fully described, and pointed out in the appended claims.

In the accompanying drawings, in which similar characters of reference denote like and corresponding parts throughout the several views thereof:—

Figure 1 is a longitudinal sectional view through the device.

Figure 2 is a sectional view on line 2—2 of Figure 1.

Referring to the drawings, 1 designates a casing consisting of a pair of sections 2 and 3, said sections having a pressed fit, as at 4. The outer ends of the sections are provided with socket members 5 and 6, respectively, in which are threaded the ends of the air line connections 7 and 8. The smooth bores of the said members constitute bearings 9 for rotatably receiving the branches 10 of the T members 11, the lateral branches 12 thereof having communicating passages 13—13 which communicate with the passages 14 of the branches 10 in order that pressure fluid can pass through the line connection 7, through the casing 1 and into the connection 8, or vice versa.

These T members have their opposed ends formed with arcuate ribs 15, the purpose of which will appear later.

Confined within the casing 1, and spaced from the wall thereof is a globular oil containing reservoir 16 having formed in its upper surface an inwardly directed wall 17 provided with a threaded opening 18 normally closed by a screw plug 19, and it is through this opening that oil is poured into the reservoir.

It will be observed that the filling opening 18 can be positioned under the relatively large opening 20 formed in the casing 1, normally closed by the screw plug 21. Upon removal of this plug oil can be readily poured into the reservoir through the opening 18, the wall 17 serving effectively as a funnel. This wall has formed therein a port 22, the purpose of which will be later explained.

The reservoir is formed with a relatively thick bottom wall which constitutes a weight 23 to maintain said reservoir at all times in a position whereby the port 22 will be held above the longitudinal axis of the reservoir.

The reservoir is provided with a peripheral groove 24, said groove being interrupted by the wall 17, but owing to the fact that the ribs 15 are comparatively long, the reservoir may make a complete revolution should the position of the casing be such as to necessitate such movement.

The weight 23 is formed with an opening 25 which includes a counter-bore 26, said counter-bore providing a seat for the felt washers 27 and 28, and the metallic disk 29 interposed therebetween, said disk having an orifice 29' formed centrally thereof. In order to maintain the washers and disk seated within the counter-bore a ring 30 is screwed therein, the opening of the ring permitting passage of oil from the reservoir through the washers and orifice of the disk, and into the casing 1.

Since the T members are capable of rotating in the bearings 9 and the reservoir can rotate between the said members the reservoir can rotate upon its longitudinal and transverse axes in order that the weight 23 will maintain the port 22 in its uppermost position regardless of the position the casing 1 may assume.

Briefly the operation is as follows:—

Pressure fluid enters the casing 1 through the connection 7 and flows around the reservoir and through the connection 8 to the drill, the passages in the T members permitting the uninterrupted flow of fluid. A small amount of pressure fluid will enter the reservoir through the port 22 and create line pressure therein and upon the surface of the oil. Obviously when air is admitted to the drill for operating the same a slight drop in pressure of the air will occur, whereupon the air in the reservoir will expand and the oil will be forced through the washers 27 and 28 and orifice 29' into the casing where it commingles with the pressure fluid passing through the casing, the oil thus expelled being carried with the pressure fluid to the drill.

The felt washers will obviously prevent leakage of oil from the reservoir by gravity when the drill is inactive.

What is claimed is:—

1. An air line oiler, comprising a casing, an oil containing reservoir mounted for uninterrupted universal movement in the casing, means for admitting pressure fluid from the casing into the reservoir, and means for discharging oil from the reservoir by pressure fluid admitted thereto.

2. An air line oiler, comprising a casing, an oil containing reservoir in the casing, means within the casing for supporting the reservoir to permit the same to rotate completely upon two perpendicular axes, means for admitting pressure fluid into the reservoir, and means for discharging oil from the reservoir under pressure of fluid admitted thereto.

3. An air line oiler, comprising a casing having its ends provided with bearings, members rotatably supported in the bearings, said members having pressure fluid passages therein communicating with the casing, an oil containing reservoir engaged between the members and capable of uninterrrupted rotation on two perpendicular axes, and means for admitting pressure fluid to the reservoir for expelling oil therefrom into the casing.

4. An air line oiler, comprising a casing having bearings in its ends, T members journaled in the bearings and having passage therein communicating with the casing, said members having ribs, an oil containing reservoir having a groove in its outer surface for engagement with the ribs, said ribs and bearings permitting universal rotation of the reservoir, means for admitting pressure fluid from the casing into the reservoir, and means for discharging oil from the reservoir into the casing under influence of fluid pressure in the reservoir.

5. An air line oiler, comprising a casing, an oil containing reservoir therein, means for supporting the reservoir permitting uninterrupted rotation thereof on two perpendicular axes, and means for admitting pressure fluid into the casing and reservoir to expel oil from the reservoir into the casing to mix with pressure fluid passing therethrough.

6. An air line oiler comprising a casing, air hose connections on opposite sides of said casing, and a reservoir mounted in said casing for uninterrupted rotation about an axis transverse with respect to an axis passing through said air hose connections.

7. An air line oiler, comprising a casing, an oil containing reservoir therein having a port for admitting pressure fluid to the reservoir from said casing, and having a port for discharging oil from the reservoir into said casing, and means supporting said reservoir within said casing for uninterrupted universal rotation with respect to said casing.

8. An air line oiler, comprising a casing, an oil containing reservoir therein having a port for admitting pressure fluid into the reservoir from said casing, and means supporting said reservoir within said casing for uninterrupted universal rotation with respect to said casing.

In testimony whereof I affix my signature.

JOHN E. RENFER.